(12) United States Patent
Petrick et al.

(10) Patent No.: US 10,491,503 B2
(45) Date of Patent: Nov. 26, 2019

(54) APPLICATION-POLICY-BASED VIRTUAL SDN CONTROLLER SYSTEM

(71) Applicant: Dell Products L.P., Round Rock, TX (US)

(72) Inventors: Christopher Stephen Petrick, Cedar Park, TX (US); Rabah S. Hamdi, Spring, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/477,840

(22) Filed: Apr. 3, 2017

(65) Prior Publication Data
US 2018/0288002 A1 Oct. 4, 2018

(51) Int. Cl.
| | |
|---|---|
| *H04L 12/26* | (2006.01) |
| *H04L 12/24* | (2006.01) |
| *H04L 29/08* | (2006.01) |
| *H04L 12/715* | (2013.01) |
| *H04L 12/801* | (2013.01) |
| *H04L 29/06* | (2006.01) |
| *H04L 12/725* | (2013.01) |

(52) U.S. Cl.
CPC .......... *H04L 43/14* (2013.01); *H04L 41/0893* (2013.01); *H04L 45/64* (2013.01); *H04L 67/2819* (2013.01); *H04L 45/306* (2013.01); *H04L 47/19* (2013.01); *H04L 63/0263* (2013.01)

(58) Field of Classification Search
CPC ............. H04L 63/0263; H04L 41/0246; H04L 41/0803; H04L 41/12; H04L 43/14; H04L 43/19; H04L 67/1002
See application file for complete search history.

(56) References Cited

U.S. PATENT DOCUMENTS

| | | | | |
|---|---|---|---|---|
| 9,521,028 | B2 * | 12/2016 | van Bemmel | .......... H04L 29/06 |
| 9,647,937 | B1 * | 5/2017 | Dukes | ..................... H04L 45/64 |
| 2015/0026313 | A1 * | 1/2015 | Chawla | .................... H04L 47/24 |
| | | | | 709/220 |
| 2015/0106526 | A1 * | 4/2015 | Arndt | .................... H04L 67/141 |
| | | | | 709/227 |
| 2015/0215156 | A1 * | 7/2015 | Yoon | ...................... H04L 45/64 |
| | | | | 370/225 |

(Continued)

*Primary Examiner* — Warner Wong
(74) *Attorney, Agent, or Firm* — Haynes and Boone, LLP (57) ABSTRACT

An application-policy-based SDN controller system includes a first device running a first application, and a second device. Each of the first device and the second device are coupled to a SDN network via one of a plurality of networking devices in the SDN network. A first virtual application-policy-based SDN controller determines a first application communication flow path through the SDN network for first application communications that are between the first device and the second device and that involve the first application. The first virtual application-policy-based SDN controller then provides at least one application-policy-based flow rule to a first subset of the plurality of networking devices that are included in the first application communication flow path. The at least one application-policy-based flow rule causes the first subset of the plurality of networking devices to transmit the first application communications such that the first application communications satisfy at least one network property.

20 Claims, 6 Drawing Sheets

(56) References Cited

U.S. PATENT DOCUMENTS

| | | | |
|---|---|---|---|
| 2015/0334045 A1* | 11/2015 | Tremblay | H04L 47/783 |
| | | | 709/226 |
| 2015/0365193 A1* | 12/2015 | Connolly | H04L 41/0803 |
| | | | 398/52 |
| 2016/0254995 A1* | 9/2016 | Wang | H04L 45/54 |
| | | | 370/392 |
| 2016/0301607 A1* | 10/2016 | Man | H04L 45/38 |
| 2016/0359721 A1* | 12/2016 | Hu | H04L 41/12 |
| 2017/0118128 A1* | 4/2017 | Vishnoi | H04L 47/2483 |
| 2017/0149670 A1* | 5/2017 | Backman | H04L 47/2441 |
| 2017/0201629 A1* | 7/2017 | Li | H04M 15/66 |
| 2017/0366416 A1* | 12/2017 | Beecham | H04L 41/12 |

\* cited by examiner

APPLICATION-POLICY-BASED VIRTUAL SDN CONTROLLER SYSTEM

BACKGROUND

The present disclosure relates generally to information handling systems, and more particularly to an application-policy-based virtual Software Defined Networking (SDN) controller that provides for the routing of application communications for a particular application through an SDN network and between information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, servers and storage systems, typically communicate with each other and/or client devices via networks that include networking devices such as switches that route those communications. Software Defined Networking (SDN) is an approach to networking that allows network administrators to programmatically initialize, control, change, and manage network behavior dynamically via open interfaces and the abstraction of lower-level functionality. Conventional non-SDN networking provides relatively static architectures that do not support dynamic, scalable computing and storage needs of modern computing environments such as datacenters, and SDN addresses such issues by decoupling the control plane (which makes decision about where communications are sent) from the data plane (which forward communications to their desired destination.) Conventional SDN systems provide physical SDN controller(s) that are coupled to the switches in the SDN network and that operate to provide rules to those switches for forwarding traffic. However, while such conventional physical SDN controllers provide for general purpose flow control, they include no behavioral understanding or other intelligence of how to manage network parameters, traffic, access, and/or other characteristics of communications between users of particular applications, application types, or applications with particular characteristics. As such, the routing of network traffic in conventional SDN systems cannot easily be optimized for particular application communications provided via SDN networks.

Accordingly, it would be desirable to provide an improved SDN controller system.

SUMMARY

According to one embodiment, an Information Handling System (IHS) includes a communication subsystem; a processing system that is coupled to the communication subsystem; and a memory system that is coupled to the processing system and that includes instructions that, when executed by the processing system, cause the processing system to provide a first virtual application-policy-based Software Defined Networking (SDN) controller that is configured to: determine a first application communication flow path through an SDN network that is coupled to the communication subsystem, wherein the first application communication flow path is determined for first application communications that are between a first device and a second device and that involve a first application; and provide at least one application-policy-based flow rule to a first subset of a plurality of networking devices that are included in the first application communication flow path through the SDN network, wherein the at least one application-policy-based flow rule causes the first subset of the plurality of networking devices to transmit the first application communications such that the first application communications satisfy at least one network property.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
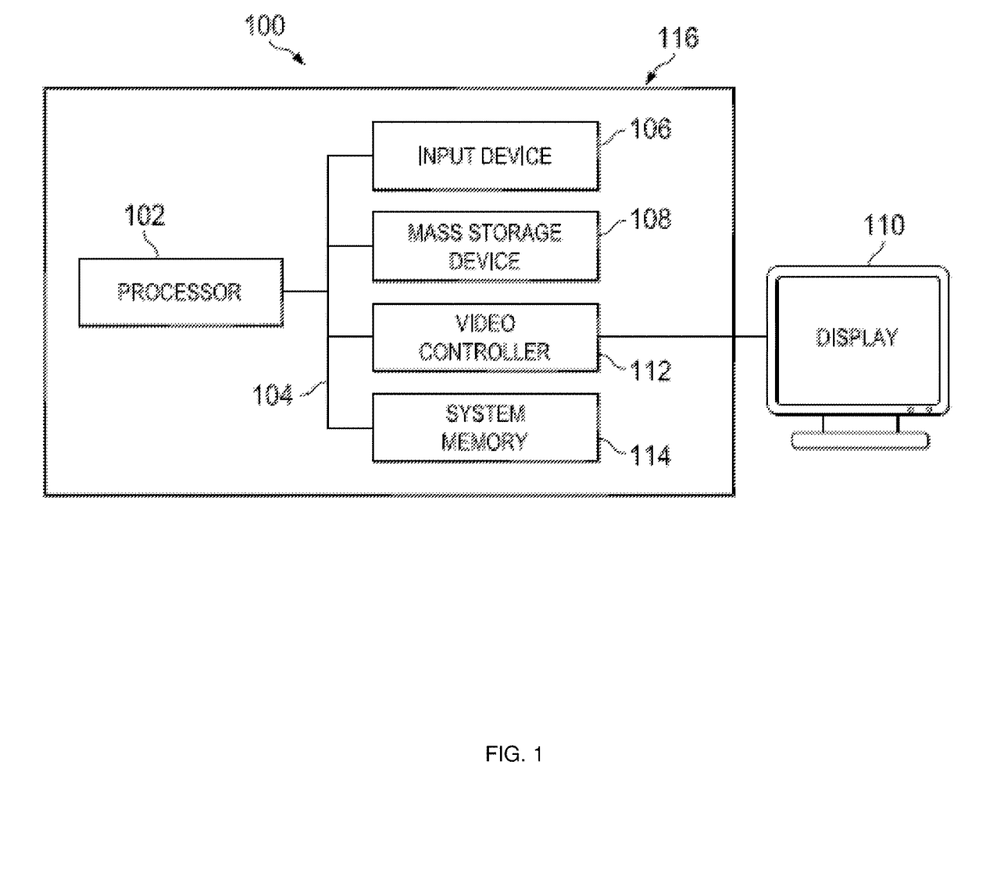
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
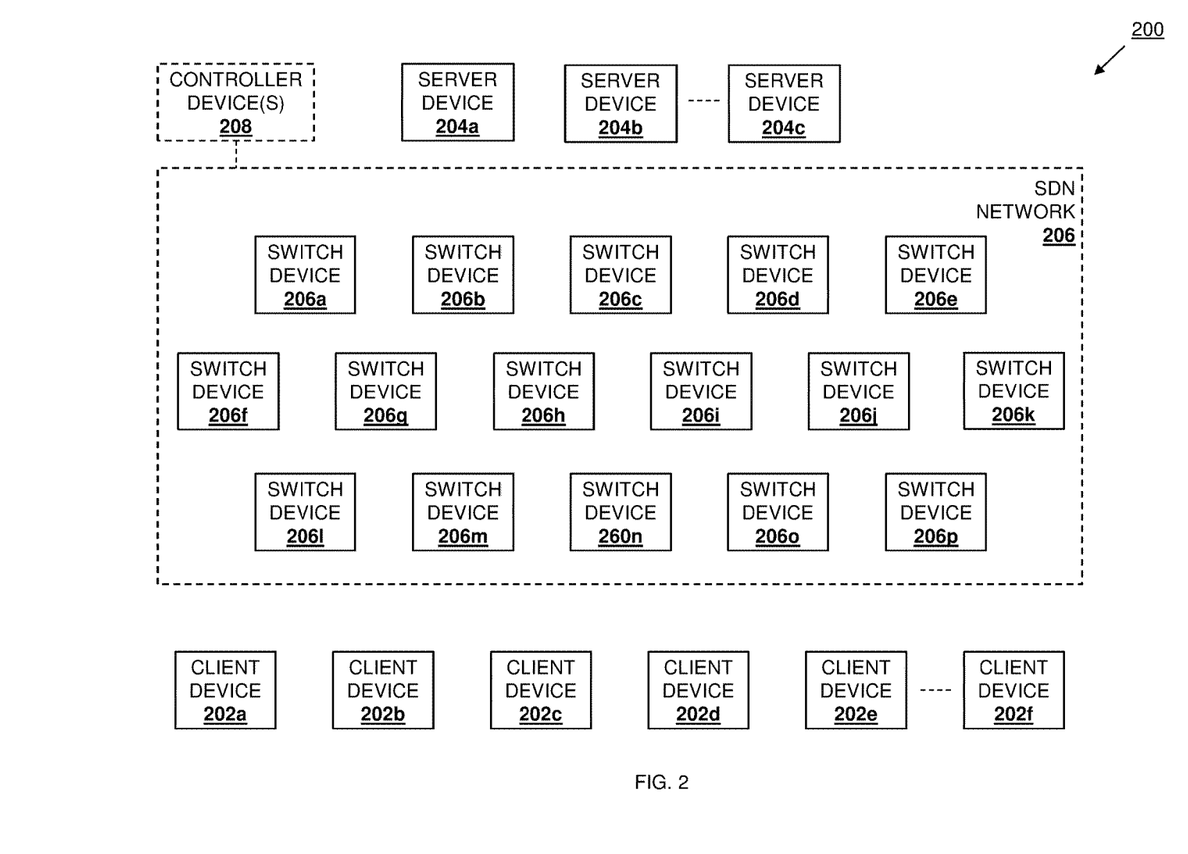
FIG. 2 is a schematic view illustrating an embodiment of an application-policy-based SDN controller system.

Referring now to FIG. 2, an embodiment of an application-policy-based SDN controller system 200 is illustrated. In the illustrated embodiment, the application-policy-based SDN controller system 200 includes a plurality of client devices 202a, 202b, 202c, 202d, 202e, and up to 202f. For example, the client devices 202a-f may be the IHS 100 discussed above with reference to FIG. 1, and/or may include some or all of the components of the IHS 100. In the embodiments discussed below, the client devices 202a-f are described as end user computing devices such as desktop computing devices, laptop/notebook computing devices, tablet computing devices, mobile phones, and/or other end user computing devices known in the art. However, in other embodiments, the client devices 202a-f may be replaced by other types of computing devices such as servers and/or other computing devices that access applications via SDN networks and that would thus benefit from the teachings below.

In the illustrated embodiment, the application-policy-based SDN controller system 200 also includes a plurality of server devices 204a, 204b, and up to 204c. For example, the server devices 204a-c may be the IHS 100 discussed above with reference to FIG. 1, and/or may include some or all of the components of the IHS 100. In the embodiments discussed below, the server devices 204a-c are described as servers that are configured to run applications that are accessed by the clients devices 202a-f. In specific examples described below, the server device 204a is configured to run desktop virtualization application(s) (e.g., Virtual Desktop Infrastructure (VDI) application(s)) that may be accessed by the client devices 202a-f, and that operate to separate a desktop environment and associated application software from those physical client devices 202a-f. As would be understood by one of skill in the art in possession of the present disclosure, the desktop virtualization applications discussed below may be provided with application virtualization and user profile management subsystems ("user virtualization") to provide a desktop environment management system in which all the components of a desktop are virtualized to allow for highly flexible and secure desktop environment delivery, as well as support desktop disaster recovery.

In specific examples described below, the server device 204b is configured to run Voice over Internet Protocol (VoIP) application(s) that may be accessed by the client devices 202a-f and that operate to deliver voice communications and/or multimedia sessions over Internet Protocol (IP) networks (e.g., the Internet.) As would be understood by one of skill in the art in possession of the present disclosure, the VoIP applications discussed below may provide signaling, channel setup, digitization of analog voice signals, encoding, and/or other VoIP functionality that allows for the packetization of the digitized information and its transmission in IP packets over a packet-switched network using various audio and video codecs.

In specific examples described below, the server device 204c is configured to run video application(s) that may be accessed by the client devices 202a-f and that operate to deliver video communications. However, while three particular applications running on respective server devices are described below, one of skill in the art in possession of the present disclosure will recognize that a wide variety of modification to the application-policy-based SDN controller system 200 will fall within the scope of the present disclosure as well. For example, multiple different applications may be provided on a single server device while remaining within the scope of the present disclosure. Furthermore, other types of applications may be provided on the server devices 202a-c (or other server devices) and may include gaming applications, storage applications, security applications, load balancing applications, and/or other applications known in the art. Further still, in some embodiments, the server devices 204a-c may be replaced by other types of computing devices such as storage systems and/or other computing devices that provision applications via SDN networks and that would thus benefit from the teachings below. For example, storage systems (i.e., provided in place of the server devices 204a-c illustrated in FIG. 2) that communicate data with server devices (i.e., provided in place of the client devices 202a-f illustrated in FIG. 2) may benefit from the teachings of the present disclosure as well, as thus are envisioned as falling within its scope.

The application-policy-based SDN controller system 200 also includes an SDN network 206 having a plurality of networking devices. In the illustrated embodiment, the plurality of networking devices are described as switch devices 206a, 206b, 206c, 206d, 206e, 206f, 206g, 206h, 206i, 206j, 206k, 206l, 206m, 206n, 206o, and 206p. However, in other embodiments, the SDN network 206 may include routers, access points, and/or a variety of other networking devices that would be apparent to one of skill in the art in possession of the present disclosure. While the physical couplings are not explicitly illustrated in FIG. 2 for clarity, the switch devices 206a-p may be interconnected in any of a variety of manners to provide the SDN network 206. In the illustrated embodiment, one or more physical controller device(s) 208 are coupled to at least one of the switch devices 206a-p in the SDN network 206. For example, the physical controller device(s) 208 may be conventional physical SDN controller device(s) that may be configured to provide the logically centralized network intelligence that determines how communications are sent via the SDN network 206 in order to disassociate those decisions from the switch devices 206a-p that route those communications from their source to their destination. However, as discussed below, in some embodiments, the physical controller device(s) 208 may be omitted (e.g., no physical SDN controller devices may be required to operate the SDN network 206, as SDN network functionality may be controlled by the virtual application-policy-based SDN controllers discussed below.) Similarly as discussed above for the switch devices 206aj-p, while the physical couplings are not explicitly illustrated in FIG. 2 for clarity, each of the client devices 202a-f and each of the server devices 204a-c are coupled to at least one of the switch devices 206a-p in the SDN network 206. While a specific application-policy-based SDN controller system 200 has been illustrated and described, one of skill in the art in possession of the present disclosure will recognize that a wide variety of modification to the number, types, and configurations of the devices discussed above will remain within the scope of the present disclosure.

Figure 3:
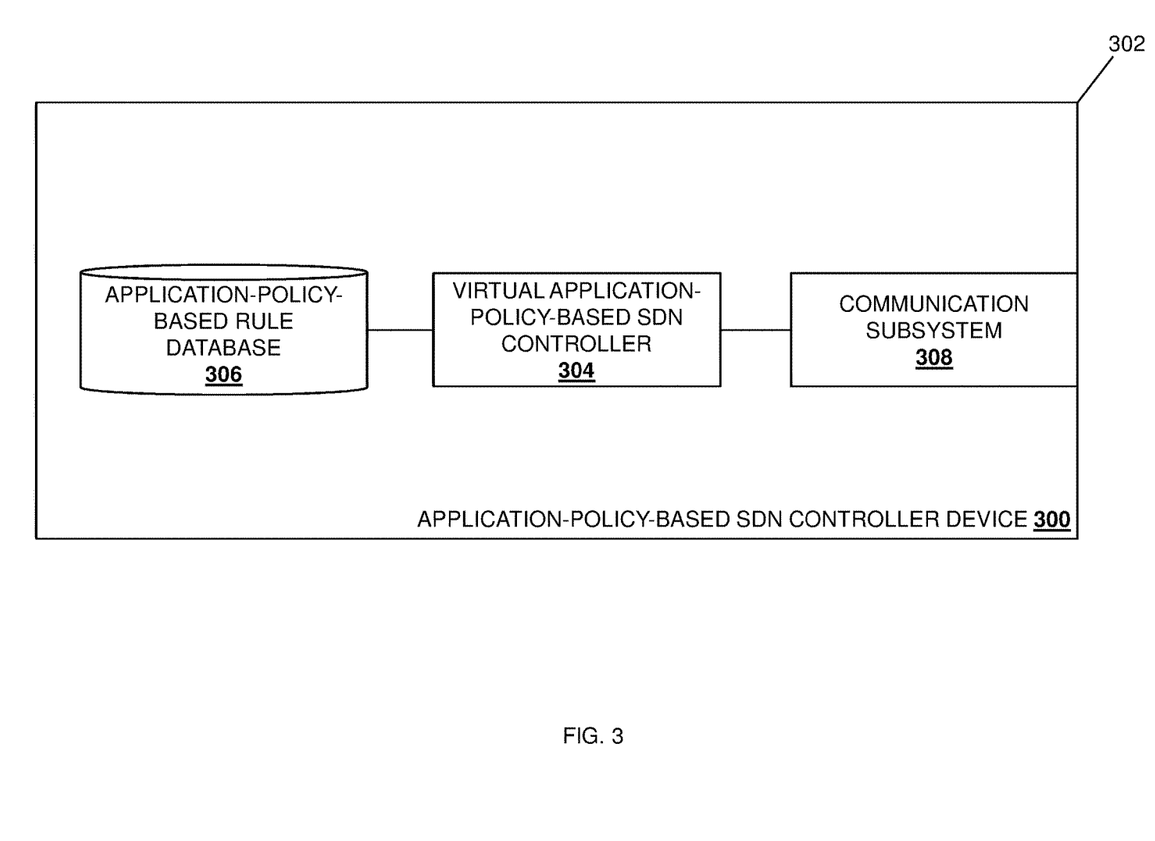
FIG. 3 is a schematic view illustrating an embodiment of an application-policy-based SDN controller device used in the application-policy-based SDN controller system of FIG. 2.

Referring now to FIG. 3, an embodiment of an application-policy-based SDN controller device 300 is illustrated. In the illustrated embodiment, the application-policy-based SDN controller device 300 includes a chassis 302 that houses the components of the application-policy-based SDN controller device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a virtual application-policy-based SDN controller 304 that is configured to perform the functions of the virtual application-policy-based SDN controllers and application-policy-based SDN controller devices discussed below. The chassis 302 may also house a storage system (not illustrated, but which may include the storage device 108 discussed above with reference to FIG. 1) that is coupled to the virtual application-policy-based SDN controller 304 (e.g., via a coupling between the storage system and the processing system) and that includes an application-policy-based rule database 306 that is configured to store the application-policy-based rules and/or other data utilized to provide the functionality discussed below. The chassis 302 may also house a communication subsystem 308 that is coupled to the virtual application-policy-based SDN controller 304 (e.g., via a coupling between the communication subsystem 308 and the processing system) and that may include a Network Interface Controller (NIC), a wireless communication subsystem (e.g., a BLUETOOTH® communication subsystem, a Near Field Communication (NFC) subsystem, etc.), and/or other communications subsystems known in the art.

As discussed below, the application-policy-based SDN controller device 300 may be provided by a device in the application-policy-based SDN controller system 200 discussed above with reference to FIG. 2. For example, the application-policy-based SDN controller device 300 may be provided by any of the server devices 204a-c, the switch devices 206a-p, and the controller device(s) 208 discussed above with reference to FIG. 2. In those example, each of the hardware components in the application-policy-based SDN controller device 300 described above may be hardware components provided in the server device, switch device, or controller device that is providing the application-policy-based SDN controller device 300, and application instructions may be provided on the memory system in that server device, switch device, or controller device in order to enable the processing system in that server device, switch device, or controller device to provide the virtual application-policy-based SDN controller 304 discussed above. As such, the application-policy-based rule database 306 may be provided on a storage system in that server device, switch device, or controller device. In a specific example, the instructions that provide for the virtual application-policy-based SDN controller 304 may be included on a non-transitory computer-readable medium, and then provided on the server device, switch device, or controller device that will provide the application-policy-based SDN controller device 300 (e.g., by connecting the physical non-transitory computer-readable medium (e.g., a Universal Serial Bus (USB) drive) to that server device, switch device, or controller device and copying those instructions; by transferring the instructions through a network from the non-transitory computer-readable medium to that server device, switch device, or controller device; etc.)

As discussed below, any number of virtual application-policy-based SDN controllers 304 may be created and provided in the application-policy-based SDN controller system 200 discussed above with reference to FIG. 2. For example, virtual application-policy-based SDN controllers 304 may be provided for particular applications (e.g., the VDI, VoIP, and video applications described herein), particular types of applications (e.g., a plurality of gaming type applications, a plurality of chat type applications, a plurality of video conferencing type applications, etc.), applications that provide for the communications of particular types of data (e.g., audio data, video data, financial data, etc.), and/or other application characteristics known in the art. As such, in the discussions below, a virtual VDI application-policy-based SDN controller is provided in the application-policy-based SDN controller system 200 for use with the VDI application provided by the server device 204a, a virtual VoIP application-policy-based SDN controller is provided in the application-policy-based SDN controller system 200 for use with the VoIP application provided by the server device 204b, and a virtual video application-policy-based SDN controller is provided in the application-policy-based SDN controller system 200 for use with the video application provided by the server device 204c.

However, in other embodiments, a virtual gaming type application-policy-based SDN controller may be provided in the application-policy-based SDN controller system 200 for use with gaming type applications provided by one or more server devices, a virtual chat type application-policy-based SDN controller may be provided in the application-policy-based SDN controller system 200 for use with chat type applications provided by one or more server devices, and a virtual video conferencing type application-policy-based SDN controller may be provided in the application-policy-based SDN controller system 200 for use with video conferencing type applications provided by one or more server devices. Similarly, in other embodiments, a virtual audio data application-policy-based SDN controller may be provided in the application-policy-based SDN controller system 200 for use with applications that generate audio data and that are provided by one or more server devices, a virtual video data application-policy-based SDN controller may be provided in the application-policy-based SDN controller system 200 for use with video data applications that generate video data and that are provided by one or more server devices, and a virtual financial data application-policy-based SDN controller may be provided in the application-policy-based SDN controller system 200 for use with financial data applications that generate financial data and that are provided by one or more server devices.

Furthermore, for each virtual application-policy-based SDN controller provided in the application-policy-based SDN controller system 200, one or more respective application-policy-based rules may be provided in the application-policy-based rule database 306. In some embodiments, the provisioning of the virtual application-policy-based SDN controller provided in the application-policy-based SDN controller system 200 may cause the virtual application-policy-based SDN controller to provide "pre-programmed" or "default" application-policy-based rule(s) (e.g., that were created as part of that virtual application-policy-based SDN controller and/or that are included in the instructions used to provide that virtual application-policy-based SDN controller) in the application-policy-based rule database 306. However, in other embodiments, the virtual application-policy-based SDN controller provided in the application-policy-based SDN controller system 200 may allow a network administrator to define and/or modify the application-policy-based rule(s) in the application-policy-based rule database 306 (e.g., via a graphical user interface provided on a management system that interfaces with the virtual application-policy-based SDN controller and that allows any of the application-policy-based rules described below to be defined and/or modified.)

As discussed in further detail below, the application-policy-based rules may be created to define how application communications involving particular applications, particular types of applications, particular types of data communicated by application(s), and/or application communications having other application characteristics, are routed through the SDN network 206 such that those application communications exhibit desired network properties. As such, application-policy-based rule(s) provided in the application-policy-based rules database 306 may include application-policy-based rules that define Quality of Service (QoS) for application communications, application-policy-based rules that define a priority for application communications, application-policy-based rules that designate port(s) on the switch devices 206a-p for handling application communications, application-policy-based rules that define load balancing for application communications, application-policy-based rules that define security for application communications, and/or a variety of other application-policy-based rules that would operate to define the handling of application communications such that they satisfy any of a variety of network properties that would be apparent to one of skill in the art in possession of the present disclosure.

Thus, continuing with the example provided above, VDI application-policy-based rules that may be provided in the application-policy-based rule database 306 for use by the virtual VDI application-policy-based SDN controller and the VDI application provided on the server device 204a may include VDI application-policy-based rules that define a QoS for VDI application communications, VDI application-policy-based rules that define priority of VDI application communications (i.e., relative to other application communications), VDI application-policy-based rules that designate port(s) on the switch devices 206a-p for handling VDI application communications, VDI application-policy-based rules that define load balancing for VDI application communications, VDI application-policy-based rules that define security for VDI application communications, and other VDI application-policy-based rules for defining other network properties of VDI application communications transmitted through the SDN network 206 by the switch devices 206a-p.

Similarly, VoIP application-policy-based rules that may be provided in the application-policy-based rule database 306 for use with the virtual VoIP application-policy-based SDN controller and the VoIP application provided on the server device 204b may include VoIP application-policy-based rules that define a QoS for VoIP application communications, VoIP application-policy-based rules that define priority of VoIP application communications (i.e., relative to other application communications), VoIP application-policy-based rules that designate port(s) on the switch devices 206a-p for handling VoIP application communications, VoIP application-policy-based rules that define load balancing for VoIP application communications, VoIP application-policy-based rules that define security for VoIP application communications, and other VoIP application-policy-based rules for defining other network properties of VoIP application communications transmitted through the SDN network 206 by the switch devices 206a-p.

Similarly, video application-policy-based rules that may be provided in the application-policy-based rule database 306 for use with the virtual video application-policy-based SDN controller and the video application provided on the server device 204c may include video application-policy-based rules that define a QoS for video application communications, video application-policy-based rules that define priority of video application communications (i.e., relative to other application communications), video application-policy-based rules that designate port(s) on the switch devices 206a-p for handling video application communications, video application-policy-based rules that define load balancing for video application communications, video application-policy-based rules that define security for video application communications, and other video application-policy-based rules for defining other network properties of video application communications transmitted through the SDN network 206 by the switch devices 206a-p.

Figure 4:
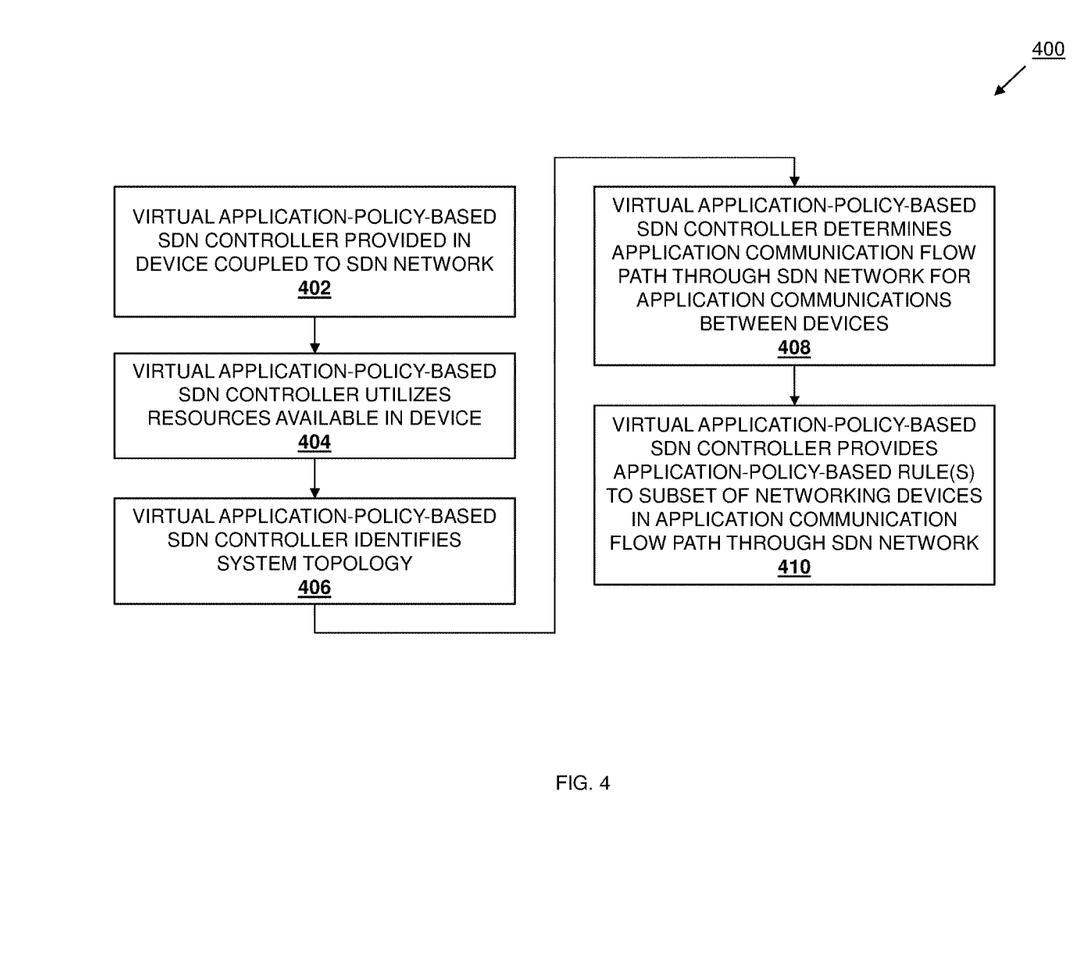
FIG. 4 is a flow chart illustrating an embodiment of a method for application-policy based SDN control.

Referring now to FIG. 4, an embodiment of a method 400 for application-policy-based SDN control is illustrated. As discussed below, the systems and methods of the present disclosure introduce the concept of a virtual application-policy-based SDN controller that provides application-policy-rules to networking devices that are part of an application communication flow path in an SDN network in order to cause application communications via that application communication flow path to satisfy at least one network property. As such, application-specific network policies and/or application aware network policies may be enforced across an SDN network for particular applications, particular application types, particular devices, and/or according to other application-based characteristics of the SDN network. Such virtual application-policy-based SDN controllers may be provided on a variety of different devices in and/or coupled to the SDN network, allowing a network administrator to initiate the enforcement of application-specific network policies and/or application aware network policies from any of those devices, rather than from a centralized physical SDN controller. As discussed below, any number of virtual application-policy-based SDN controllers may be provided in order to set application-specific network policies for any number of applications provided through the SDN network, thus providing a wide degree of flexibility in applying such application-specific network policies and/or application aware network policies to an SDN network as the number of applications provided via that SDN network increases.

The method 400 may begin at block 402 where a virtual application-policy-based SDN controller is provided in a device coupled to an SDN network. In an embodiment, at block 402, the virtual application-policy-based SDN controller 304 discussed above with reference to FIG. 3 may be provided on one of the server devices 204a-c coupled to the SDN network 206, one of the switch devices 206a-p in the SDN network 206, or one of the controller device(s) 208 coupled to the SDN network 206. In some examples, the virtual application-policy-based SDN controller 304 may be provided on the device before it is included in or coupled to the SDN network 206, while in other examples, the virtual application-policy-based SDN controller 304 may be provided in the device (i.e., via instructions copied to a memory system in the device) after the device has already been included in or coupled to the SDN network 206. As will be appreciated by one of skill in the art in possession of the present disclosure, at block 402 a network administrator may provide the virtual application-policy-based SDN controller 304 on one of the server devices 204a-c that is being coupled to the SDN network 206 in order to provide a particular application, on one of the switch devices 206a-p that is conveniently located adjacent the network administrator, one of the controller devices 208 that is conveniently located adjacent the network administrator, or on any other device included in or coupled to the SDN network 206, which provides an easier and more convenient means for implementing SDN network policies than are available with conventional SDN networked systems (e.g., that require the use of a physical SDN controller to centrally implement any SDN network policies).

Thus, in specific example(s) discussed below, at block 402 the network administrator may provide a virtual VDI application-policy-based SDN controller on a device in the application-policy-based SDN controller system 200 for use with the VDI application provided by the server device 204a, a virtual VoIP application-policy-based SDN controller on a device in the application-policy-based SDN controller system 200 for use with the VoIP application provided by the server device 204b, or a virtual video application-policy-based SDN controller on a device in the application-policy-based SDN controller system 200 for use with the video application provided by the server device 204c. However, while each of the virtual VDI application-policy-based SDN controller, the virtual VoIP application-policy-based SDN controller, and the virtual video application-policy-based SDN controller are described as being provided on different server devices, in other embodiments different combinations, or all, of those virtual application-policy-based SDN controllers may be provided on the same server device The method 400 then proceeds to block 404 where the virtual application-policy-based SDN controller utilizes resources available in the device. In an embodiment, at block 404 the virtual application-policy-based SDN controller 304 may operate to utilize resources available in the device on which it was provided at bock 402. For example, upon initialization of the virtual application-policy-based SDN controller 304 following its provisioning on the device, the virtual application-policy-based SDN controller 304 may communicate with that device (e.g., a management controller, operating system, or other entity that is operating on the device and is configured to determine, retrieve, or otherwise report the device resources to the virtual application-policy-based SDN controller) to determine what resources are available on the device for performing the virtual application-policy-based SDN controller functionality discussed below. In a specific example, at block 404 the virtual application-policy-based SDN controller 304 may identify processing system resources (i.e., of a processing system included in the device) and memory system resources (i.e., of a memory system included in the device) that will allow the virtual application-policy-based SDN controller 304 to perform the functionality discussed below. Furthermore, at block 404 the virtual application-policy-based SDN controller 304 may identify storage system resources (i.e., of a storage system included in the device) that will allow for the storage of the application-policy-based rule database 206 discussed above with reference to FIG. 3. Further still, at block 404 the virtual application-policy-based SDN controller 304 may identify communication subsystem resources (i.e., of a communication subsystem included in the device) that will allow for the virtual application-policy-based SDN controller communications discussed below.

As such, in some embodiments of block 404, the virtual application-policy-based SDN controller 304 may identify unused resources in the device it was provided in, and utilize those unused resources. However, in other embodiments, at block 404 the virtual application-policy-based SDN controller 304 may negotiate with the device that it was provided in to allocate the use of resources in that device that will allow the virtual application-policy-based SDN controller 304 to operate properly. In either embodiment, the utilization of the resources of the device at block 404 may include the utilization of some portion of those resources by the virtual application-policy-based SDN controller 304 to perform the virtual application-policy-based SDN controller functionality discussed below, as well as the utilization of some portion of those resources by the device to perform other device functionality (e.g., application running/provisioning, switching, controlling, etc.) As such, while illustrated as occurring at block 404, one of skill in the art in possession of the present disclosure will recognize that the utilization of the resources of the device by the virtual application-policy-based SDN controller 304 may occur throughout the method 400.

At block 404, the virtual application-policy-based SDN controller 304 may also create the application-policy-based rule database 306 using storage system resources available on the device. As discussed above, in some embodiments the virtual application-policy-based SDN controller 304 may provide one or more "pre-programmed" or "default" application-policy-based rule(s) (e.g., that were created as part of that virtual-policy-based SDN controller and/or included in the instructions that provide that virtual application-policy-based SDN controller) in the application-policy-based rule database 306. However, in other embodiments, the virtual application-policy-based SDN controller may allow a network administrator to define and/or modify the application-policy-based rule(s) provided in the application-policy-based rule database 306. As such, the virtual application-policy-based SDN controller 304 may be configured to generate a graphical user interface on a management system (e.g., a laptop/notebook computing device, tablet computing device, mobile phone, or other device coupled to the device that includes the virtual application-policy-based SDN controller) that interfaces with the virtual application-policy-based SDN controller 304 and allows the user to modify any default application-policy-based rules and/or create application-policy-based rules in the application-policy-based rule database 306. As discussed above, and further below, the provisioning and/or modification of the application-policy-based rules in the application-policy-based rule database 306 allows a network administrator to define the application-specific network properties and/or application aware network policies for of any application communications related to any application accessed via the SDN network 206

The method 400 then proceeds to block 406 where the virtual application-policy-based SDN controller identifies a system topology. In an embodiment, at block 406 the virtual application-policy-based SDN controller 304 may communicate through its communication subsystem 308 with one or more of the devices included in or coupled to the SDN network 206 in order to identify a topology of the application-policy-based SDN controller system 200. For example, at block 406 the virtual application-policy-based SDN controller 304 may communicate with one or more of the switch devices 206a-p in the SDN network 206 to retrieve system topology information from each those switch device(s) such as, for example, device identifiers for the switch device, port identifiers for ports on the switch device, resource information for the switch device that identifies the capabilities of that switch device, information about other switch device(s) coupled to that switch device, and/or any other system topology information that would be apparent to one of skill in the art in possession of the present disclosure. In a specific example, the virtual application-policy-based SDN controller 304 may communicate with each of the switch devices 206a-p in the SDN network 206 to retrieve the system topology information discussed above. However, in another example, the virtual application-policy-based SDN controller 304 may retrieve the system topology information discussed above by communicating with only some of the switch devices 206a-p in the SDN network 206, with those switch devices having retrieved system topology information from the other switch devices in the SDN network 206.

In another example, at block 406 the virtual application-policy-based SDN controller 304 may communicate with one or more of the client devices 202a-f that are coupled to the SDN network 206 (e.g., via one or more of the switch devices 206a-p) to retrieve system topology information from each those client device(s) such as, for example, device identifiers for the client device, port identifiers for ports on the client device, resource information for the client device that identifies the capabilities of that client device, information about which switch device(s) that client device is coupled to, information about applications that client device is configured to utilize and/or access, and/or any other system topology information that would be apparent to one of skill in the art in possession of the present disclosure. In a specific example, the virtual application-policy-based SDN controller 304 may communicate with each of the client devices 202a-f coupled to the SDN network 206 (e.g., via the switch devices(s) 206a-p) to retrieve the system topology information discussed above. However, in another example, the virtual application-policy-based SDN controller 304 may retrieve the system topology information discussed above by communicating with only some of the client devices 202a-f or the switch devices 206a-p in the SDN network 206, with those client devices or switch devices having retrieved system topology information from the other client devices in the SDN network 206.

In another example, at block 406 the virtual application-policy-based SDN controller 304 may communicate with one or more of the server devices 204a-c that are coupled to the SDN network 206 (e.g., via one or more of the switch devices 206a-p) to retrieve system topology information from each those server device(s) such as, for example, device identifiers for the server device, port identifiers for ports on the server device, resource information for the server device that identifies the capabilities of that server device, information about which switch device(s) that server device is coupled to, and/or any other system topology information that would be apparent to one of skill in the art in possession of the present disclosure. In a specific example, the virtual application-policy-based SDN controller 304 may communicate with each of the server devices 204a-c coupled to the SDN network 206 (e.g., via one or more of the switch devices 206a-p) to retrieve the system topology information discussed above. However, in another example, the virtual application-policy-based SDN controller 304 may retrieve the system topology information discussed above by communicating with only some of the server devices 204a-c or the switch devices 206a-p in the SDN network 206, with those server devices or switch devices having retrieved system topology information from the other server devices in the SDN network 206.

In another example, at block 406 the virtual application-policy-based SDN controller 304 may communicate with one or more of the controller device(s) 208 that are coupled to the SDN network 206 (e.g., via one or more of the switch devices 206a-p) to retrieve system topology information from the controller device 208 for each of the device(s) included in or coupled to the SDN network 206. In a specific example, the controller device 208 may have previously collected the system topology information from each of the devices included in or coupled to the SDN network 206, and as such, as block 406 the virtual application-policy-based SDN controller 304 may simply collect that system topology information from the controller device 208. At block 406, the virtual application-policy-based SDN controller 304 may store any of the system topology information that is collected in a storage system of the device (e.g., along with the application-policy-based rule database 306.)

As such, at block 406, the virtual application-policy-based SDN controller 304 receives system topology information for a plurality of devices included in or coupled to the SDN network 206. At block 406, the virtual application-policy-based SDN controller 304 may then analyze the system topology information to identify the topology of the application-policy-based SDN controller system 200. In some embodiments, the identification of the topology of the application-policy-based SDN controller system 200 may include the identification of any or all of the following client device information: identifiers for the client devices 202a-f, the connection details of the client devices 202a-f to the SDN network 206, application functionality enabled on the client devices 202a-f, users of the client devices 202a-f, capabilities of the client devices 202a-f, and/or any other client device information that would be apparent to one of skill in the art in possession of the present disclosure. In some embodiments, the identification of the topology of the application-policy-based SDN controller system 200 may include the identification of any or all of the following server device information: identifiers for the server devices 204a-c, the connection details of the server devices 204a-c to the SDN network 206, application(s) running on the client devices 204a-c, permission information for accessing the server devices 204a-c, capabilities of the server devices 204a-c, and/or any other server device information that would be apparent to one of skill in the art in possession of the present disclosure. In some embodiments, the identification of the topology of the application-policy-based SDN controller system 200 may include the identification of any or all of the following networking device information: identifiers for the switch devices 206a-p, the connection details of the switch devices 206a-p to the SDN network 206 as well as to the client devices 202a-f and server devices 204a-c, capabilities of the switch devices 206a-p, and/or any other networking device information that would be apparent to one of skill in the art in possession of the present disclosure.

The method 400 then proceeds to block 408 where the virtual application-policy/based SDN controller determines an application communication flow path through the SDN network for application communications between devices. In an embodiment, at block 408 the virtual application-policy-based SDN controller 304 operates to determine an application communication flow path that extends between at least one of the clients devices 202a-f and at least one of the server devices 204a-c, and that includes a subset of the plurality of switch devices 206a-p in the SDN network 206. For example, using the system topology information identified at block 406, a virtual VDI application-policy-based SDN controller may determine that the client device 202a is configured to utilize and/or access the VDI application provided by the server device 204a, is requesting to access the VDI application provided by the server device 204a, and/or is otherwise associated with the VDI application provided by the server device 204a. In response, the virtual VDI application-policy-based SDN controller may then operate to determine a VDI application communication flow path for VDI application communications between the client device 202a and the server device 204a that involve the VDI application.

For example, the virtual VDI virtual application-policy-based SDN controller may utilize the system topology information identified at block 406 to determine the subset of switch devices that will provide the VDI application communication flow path. For example, the virtual VDI application-policy-based SDN controller may be configured to ensure that any VDI application communications are provided through switch devices in the SDN network 206 that are capable of providing those VDI application communications with some minimum network properties. As such, at block 408, the virtual VDI application-policy-based SDN controller may analyze the device identifiers for each of the switch devices 206a-p, port identifiers for ports on the switch devices 206a-p, resource information for the switch devices 206a-p that identifies the capabilities of the switch devices 206a-p, the information about the coupling together of the switch devices 206a-p, and/or any other system topology information retrieved from the switch devices 206a-p, in order to determine which of the switch devices 206a-p are capable of providing those VDI application communications with the minimum network properties.

In some embodiments, the virtual VDI application-policy-based SDN controller may then determine device information about the switch devices 206a-p that are capable of providing VDI application communications with the minimum network properties including, for example, current traffic loads, device health information, and/or other device details that indicate the current operation of those switch devices 206a-p. Further still, the virtual VDI application-policy-based SDN controller may then perform shortest path analysis on the switch devices 206a-p that are both capable of providing VDI application communications with the minimum network properties and from which desirable device information was received (e.g., below some maximum traffic load, having some satisfactory device health, etc.) in order to determine one or more shortest paths for VDI application communications between the client device 202a and the server device 204a using those switch devices. As such, the VDI application communication path for VDI application communications between the client device 202a and the server device 204a may be determined that includes a subset of the switch devices 206a-p that are capable of providing VDI application communications with the minimum network properties, that include desirable device information, and that provide the shortest path for those VDI application communications of all the qualifying switch devices. With reference to the example illustrated in FIG. 5A, the virtual VDI application-policy-based SDN controller has determined a VDI application communication path for VDI application communications between the client device 202a and the server device 204a that includes the switch devices 206a and 206l.

In another example, using the system topology information identified at block 406, a virtual VoIP application-policy-based SDN controller may determine that the client devices 202d and 202f are configured to utilize and/or access the VoIP application provided by the server device 204b, are requesting to access the VoIP application provided by the server device 204b, and/or are otherwise associated with the VoIP application provided by the server device 204b. In response, the virtual VoIP application-policy-based SDN controller may determine VoIP application communication flow paths for VoIP application communications between the client devices 202d, 202f and the server device 204b that involve the VoIP application.

For example, the virtual VoIP virtual application-policy-based SDN controller may utilize the system topology information identified at block 406 to determine the subset of switch devices that will provide the VoIP application communication flow paths. For example, the virtual VoIP application-policy-based SDN controller may be configured to ensure that any VoIP application communications are provided through switch devices in the SDN network 206 that are capable of providing those VoIP application communications with some minimum network properties. As such, at block 408, the virtual VoIP application-policy-based SDN controller may analyze the device identifiers for each of the switch devices 206a-p, port identifiers for ports on the switch devices 206a-p, resource information for the switch devices 206a-p that identifies the capabilities of the switch devices 206a-p, the information about the coupling together of the switch devices 206a-p, and/or any other system topology information retrieved from the switch devices 206a-p in order to determine which of the switch devices 206a-p are capable of providing those VoIP application communications with the minimum network properties.

In some embodiments, the virtual VoIP application-policy-based SDN controller may then determine device information about the switch devices 206a-p that are capable of providing VoIP application communications with the minimum network properties including, for example, current traffic loads, device health information, and/or other device details that indicate the current operation of those switch devices 206a-p. Further still, the virtual VoIP application-policy-based SDN controller may then perform shortest path analysis on the switch devices 206a-p that are both capable of providing VoIP application communications with the minimum network properties and from which desirable device information was received (e.g., below some maximum traffic load, having some satisfactory device health, etc.) in order to determine one or more shortest paths for VoIP application communications between the client devices 202d, 202f and the server device 204b using those switch devices. As such, the VoIP application communication paths for VoIP application communications between the client devices 202d, 202f and the server device 204b may be determined that includes a subset of the switch devices 206a-p that capable of providing VoIP application communications with the minimum network properties, that include desirable device information, and that provide the shortest path for those VoIP application communications of all the qualifying switch devices. With reference to the example illustrated in FIG. 5A, the virtual VoIP application-policy-based SDN controller has determined a VoIP application communication path for VoIP application communications between the client device 202d and the server device 204b that includes the switch devices 206c, 206h, and 206n, as well as a VoIP application communication path for VoIP application communications between the client device 202f and the server device 204b that includes the switch devices 206d, 206j, and 206p.

Furthermore, in some embodiments, more than one application communication flow path may be determined between a client device and a server device in substantially the same manner as described above. For example, FIG. 5B illustrates an embodiment in which the virtual VDI application-policy-based SDN controller has determined another VDI application communication path for VDI application communications between the client device 202a and the server device 204a that includes the switch devices 206d, 206h, and 206m (i.e., in addition to the VDI application communication path for VDI application communications between the client device 202a and the server device 204a that includes the switch devices 206a and 206l.) In some embodiments, the multiple application communication paths may provide a primary application communication path, as well as a backup application communication path that may be utilized if the primary application communication path fails (e.g., a switch device in that primary application communication path becomes unavailable). In other embodiments, the multiple application communication paths may provide a first application communication path and a second application communication path that may both be utilized to transmit application communications substantially simultaneously (e.g., to increase application communication bandwidth, because neither application communication path can satisfy an application communication bandwidth requirement (i.e., network property) by itself, etc.)

While a few specific examples of a VDI application communication path and VoIP application communication paths are illustrated and described, one of skill in the art in possession of the present disclosure will recognize that any virtual application-policy-based SDN controller may be provided in the application-policy-based SDN controller system in order to determine application communication flow paths for application communications between devices and via the SDN network 206. As such, the teachings of the present disclosure may be utilized to determine application communication flow paths for storage applications, security application, load balancing applications, video surveillance systems, and/or any other application communications provided through an SDN network.

Furthermore, the determination of application communication flow paths may provide for a variety of unique functionality that is not seen in conventional SDN networks. For example, a virtual VoIP application-policy-based SDN controller may identify a request that was received by a first switch device from a client device to initiate a VoIP call to another client device. Using the system topology information received at block 406, the virtual VoIP application-policy-based SDN controller may determine that the first switch device is a 1 gigabit switch device. Furthermore, the virtual VoIP application-policy-based SDN controller may be configured to create VoIP application flow paths for VoIP application communications using switch devices that support a minimum data transfer rate of 10 gigabits, and thus the VoIP application communication flow path may not include the 1 gigabit switch device upon which the request was received if a 10 gigabit switch device is available to receive the VoIP application communications directly from the client device. Similarly, path selection based on latency (e.g., a 100 millisecond latency tolerance versus a 10 millisecond latency tolerance) in switches, or to provide load balancing of data across systems (e.g., having 10 GB/s of data for transmission and creating two 10 GB/s paths that each transmit 5 GB/s of that data while providing for the failover of the other path) will fall within the scope of the present disclosure as well.

The method 400 then proceeds to block 410 where the virtual application-policy-based SDN controller provides one or more application-policy-based rules to the subset of the plurality of networking devices in the application communication flow path through the SDN network. In an embodiment, at block 410 the virtual application-policy-based SDN controller 304 operates to retrieve one or more application-policy-based rules from the application-policy-based rule database 306, and provides those application-policy-based rule(s) to the subset of the switch devices 206a-p that provide the application communication flow path determined at block 408. In some embodiments, the virtual application-policy-based SDN controller 304 may provide the application-policy-based rules to the switch device(s) via its coupling to those switch device(s). For example, a virtual application-policy-based SDN controller provided in one of the server devices 204a-c or controller device(s) 208 may provide the application-policy-based rules to any switch device via their direct coupling, or via their indirect coupling through other switch device(s). Similarly, a virtual application-policy-based SDN controller provided in one of the switch devices 206a-p may provide the application-policy-based rules to any switch device via their direct coupling, or via their indirect coupling through other switch device(s).

In other embodiments, the virtual application-policy-based SDN controller 304 may provide the application-policy-based rules to the switch device(s) via the controller device(s) 208 For example, a virtual application-policy-based SDN controller provided in one of the server devices 204a-c may provide the application-policy-based rules to any the controller device(s) 208 via their indirect coupling through the switch device(s), and those controller device(s) 208 may then provide those rules to the subset of switch devices in the application communication flow path. Similarly, a virtual application-policy-based SDN controller provided in one of the switch devices 206a-p may provide the application-policy-based rules to any of the controller device(s) 208 via their direct coupling, or their indirect coupling via other switch device(s), and those controller device(s) 208 may then provide those rules to the subset of switch devices in the application communication flow path.

Figure 5A:
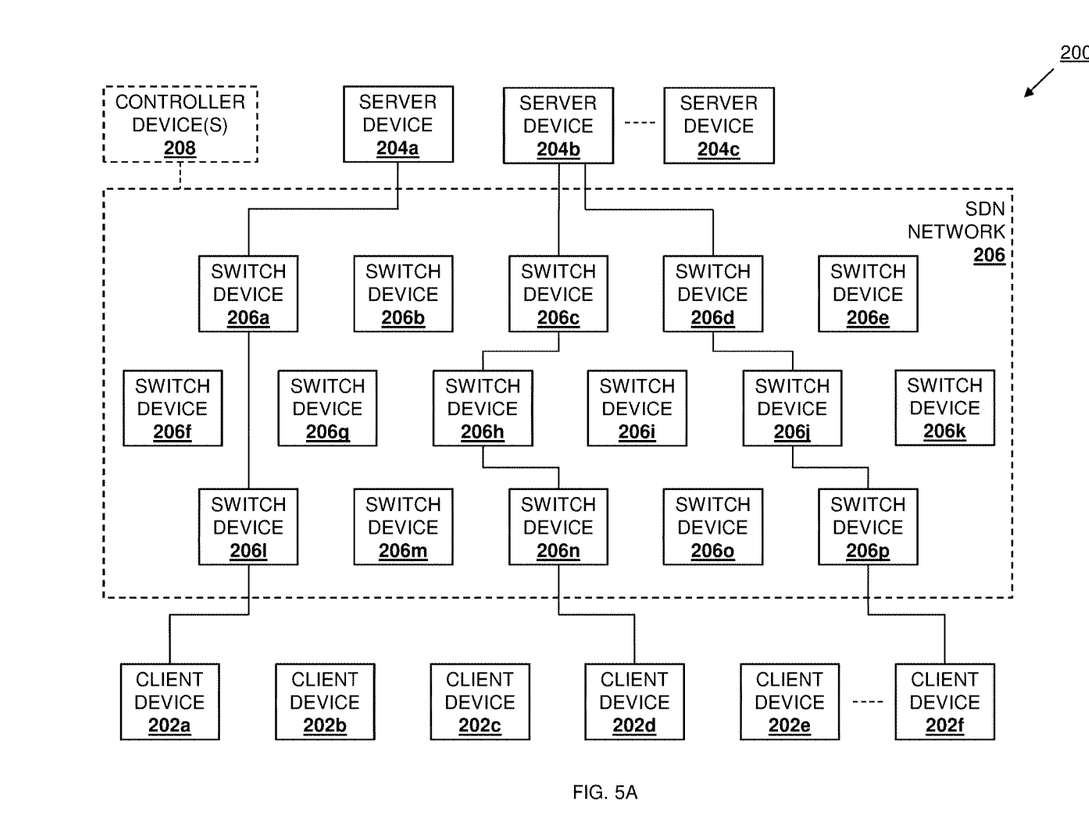
FIG. 5A is a schematic view illustrating application communication paths determined in the application-policy-based SDN controller system of FIG. 2 during the method of FIG. 4.
Figure 5B:
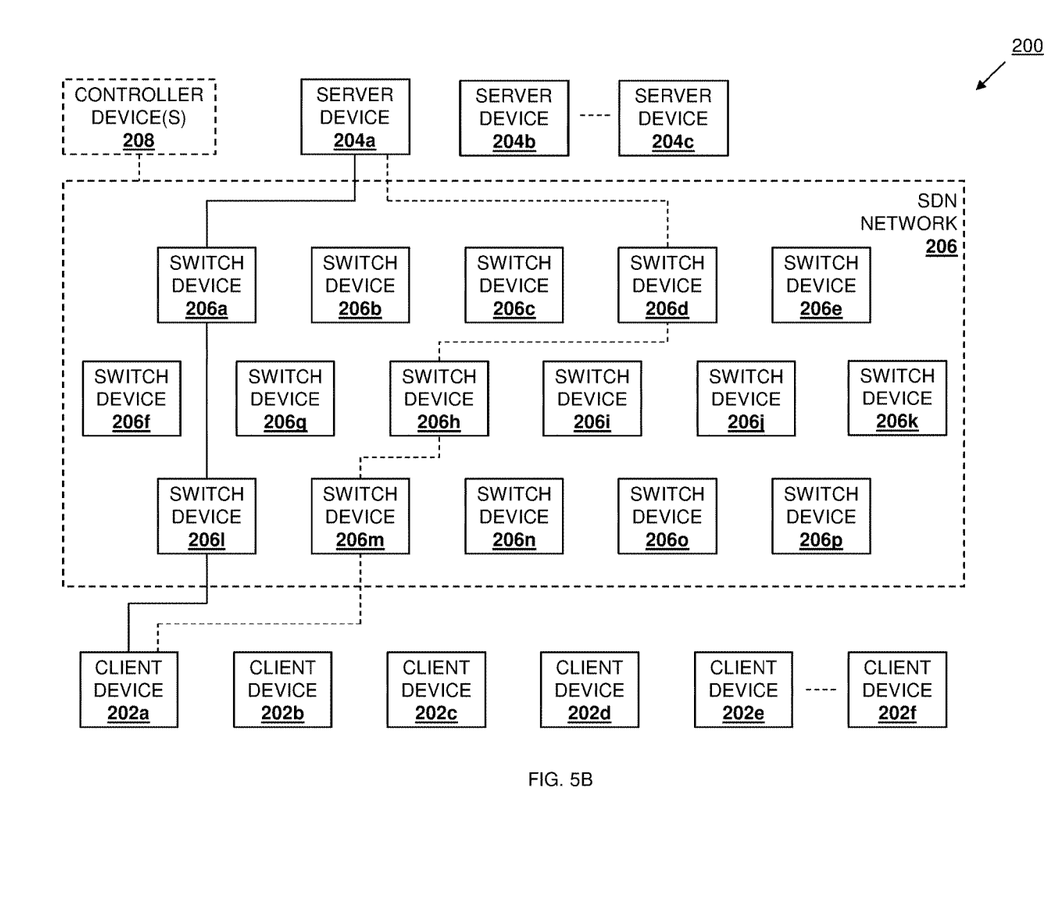
FIG. 5B is a schematic view illustrating application communication paths determined in the application-policy-based SDN controller system of FIG. 2 during the method of FIG. 4.

For example, with reference to FIG. 5A, at block 410 the VDI application-policy-based SDN controller may provide each of the switch devices 206a and 206l (in the VDI application communication flow path determined at block 408) with VDI application-policy-based rules that define a QoS for VDI application communications between the client device 202a and the server device 204a, VDI application-policy-based rules that define priority of VDI application communications between the client device 202a and the server device 204a (i.e., relative to other application communications transmitted through the SDN network 206), VDI application-policy-based rules that designate port(s) on the switch devices 206a and 206l for handling VDI application communications between the client device 202a and the server device 204a, VDI application-policy-based rules that define load balancing for VDI application communications between the client device 202a and the server device 204a, VDI application-policy-based rules that define security for VDI application communications between the client device 202a and the server device 204a, and/or other VDI application-policy-based rules for enforcing other network properties of VDI application communications transmitted through the SDN network 206 by the switch devices 206a and 206l. As such, following the receipt of the VDI application-policy-based rules, the switch devices 206a and 206l may receive VDI application communications from the client device 202a and/or the server device 204a, and transmit those VDI application communications to the other according the VDI application-policy-based rules such that any of a plurality of network properties are satisfied.

Similarly, with reference to FIG. 5A, at block 410 the VoIP application-policy-based SDN controller may provide each of the switch devices 206c, 206d, 206h, 206j, 206n, and 206p (in the VoIP application communication flow paths determined at block 408) with VoIP application-policy-based rules that define a QoS for VoIP application communications between the client devices 202d, 202f and the server device 204b, VoIP application-policy-based rules that define priority of VDI application communications between the client devices 202d, 202f and the server device 204b (i.e., relative to other application communications transmitted through the SDN network 206), VoIP application-policy-based rules that designate port(s) on the switch devices 206c, 206d, 2106h, 206j, 206n, and 206p for handling VoIP application communications between the client devices 202d, 202f and the server device 204b, VoIP application-policy-based rules that define load balancing for VoIP application communications between the client devices 202d, 202f and the server device 204b, VoIP application-policy-based rules that define security for VoIP application communications between the client devices 202d, 202f and the server device 204b, and/or other VoIP application-policy-based rules for enforcing other network properties of VoIP application communications transmitted through the SDN network 206 by the switch devices 206c, 206d, 2106h, 206j, 206n, and 206p. As such, following the receipt of the VDI application-policy-based rules, the switch devices 206c, 206d, 2106h, 206j, 206n, and 206p may receive VoIP application communications from the client devices 202d, 202f and/or the server device 204b, and transmit those VDI application communications according the VoIP application-policy-based rules such that any of a plurality of network properties are satisfied.

While a few specific examples of a VDI application-policy-based rules and VoIP application-policy-based rules have been described, one of skill in the art in possession of the present disclosure will recognize that any virtual application-policy-based SDN controller may be provided in the application-policy-based SDN controller system in order to provide application-policy-based rules for any application communications through the SDN network 206 and between devices coupled to that SDN network 206. As such, the teachings of the present disclosure may be utilized to provide application-policy-based rules for storage application communications, security application communications, load balancing application communications, and/or any other application communications provided through an SDN network. Furthermore, the determination of application communication flow paths may provide for a variety of unique functionality that is not seen in conventional SDN networks.

Thus, systems and methods have been described that provide a virtual application-policy-based SDN controller determines an application communication flow path for application communications through an SDN network and between devices, and then pushes application-policy-rules to networking devices ensure that application communications between the devices and on the application communication flow path in the SDN network are provided with minimum network properties. The systems and methods of the present disclosure provide for the enforcement of network policies across an SDN network for particular applications, particular application types, and particular devices via virtual application-policy-based SDN controllers that may be provided on a variety of different devices in and/or coupled to the SDN network, allowing a network administrator to initiate the enforcement of application-specific network policies from any of those devices rather than from a centralized physical SDN controller. As such, substantial benefits related to flexibility in applying application-specific network policies to an SDN network are enabled, particularly as the number of applications provided via that SDN network expands.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An application-policy-based Software Defined Network (SDN) controller system, comprising:
    a first device that is configured to run a first application;
    a second device;
    a physical Software Defined Networking (SDN) network that includes a plurality of physical networking devices, wherein each of the first device and the second device is coupled to the physical SDN network via at least one of the plurality of physical networking devices; and
    a first virtual application-policy-based SDN controller that is associated with the first application and that is provided on a first virtualization device that is not a physical SDN controller device, that is either included in the physical SDN network or coupled to the physical SDN network, and that is part of at least one application communication flow path enabled by the physical SDN network, wherein the first virtual application-policy-based SDN controller is configured to:
        determine a first application communication flow path through the physical SDN network for first application communications that are between the first device and the second device and that involve the first application; and
        provide at least one application-policy-based flow rule to a first subset of the plurality of physical networking devices that are included in the first application communication flow path, wherein the at least one application-policy-based flow rule causes the first subset of the plurality of physical networking devices to transmit the first application communications such that the first application communications satisfy at least one network property.

2. The system of claim 1, wherein the first virtualization device is provided by the first device that runs the first application.

3. The system of claim 1, wherein the first virtualization device is provided by one of the plurality of physical networking devices.

4. The system of claim 1, further comprising:
a backup virtual application-policy-based SDN controller that is provided on a second virtualization device that is different than the first virtualization device, wherein the backup virtual application-policy-based SDN controller is configured to perform the operations of the first virtual application-policy-based SDN controller in the event of the unavailability of the first virtual application-policy-based SDN controller.

5. The system of claim 1, wherein the first virtual application-policy-based SDN controller is configured to:
determine a second application communication flow path through the physical SDN network for second application communications that are between the first device and the second device and that involve the first application; and
provide at least one application-policy-based flow rule to a second subset of the plurality of physical networking devices that are included in the second application communication flow path and that include at least one physical networking device that is not included in the first subset of the plurality of physical networking devices, wherein the at least one application-policy-based flow rule causes the second subset of the plurality of physical networking devices to transmit the second application communications such that the second application communications satisfy at least one network property.

6. The system of claim 1, further comprising:
a third device that is configured to run a second application that is a different type of application than the first application; and
a second virtual application-policy-based SDN controller that is associated with the second application and not the first application, and that is provided on a second virtualization device that is not a physical SDN controller device, that is either included in the physical SDN network or coupled to the physical SDN network, and that is part of at least one application communication flow path enabled by the physical SDN network, wherein the second virtual application-policy-based SDN controller is configured to:
determine a second application communication flow path through the physical SDN network for second application communications that are between the second device and the third device and that involve the second application; and
provide at least one application-policy-based flow rule to a second subset of the plurality of physical networking devices that are included in the second application communication flow path and that include at least one physical networking device that is not included in the first subset of the plurality of physical networking devices, wherein the at least one application-policy-based flow rule causes the second subset of the plurality of physical networking devices to transmit the second application communications such that the second application communications satisfy at least one network property.

7. The system of claim 1, further comprising:
a physical SDN controller that is coupled to each of the plurality of physical networking devices in the physical SDN network, wherein the first virtual application-policy-based SDN controller is configured to provide the at least one application-policy-based flow rule through the physical SDN controller to each of the first subset of the plurality of physical networking devices that are included in the first application communication flow path.

8. An Information Handling System (IHS), comprising:
a communication subsystem;
a processing system that is coupled to the communication subsystem; and
a memory system that is coupled to the processing system and that includes first instructions that, when executed by the processing system, cause the processing system to provide a first virtual application-policy-based Software Defined Networking (SDN) controller that is virtualized using the communication subsystem, the processing system, and the memory system and that is configured to:
determine a first application communication flow path through a physical SDN network that is coupled to the communication subsystem, wherein the first application communication flow path is determined for first application communications that are between a first device and a second device and that involve a first application that is associated with the first virtual application-policy-based SDN controller; and
provide at least one application-policy-based flow rule to a first subset of a plurality of physical networking devices that are included in the first application communication flow path through the physical SDN network, wherein the at least one application-policy-based flow rule causes the first subset of the plurality of networking devices to transmit the first application communications such that the first application communications satisfy at least one network property,
wherein the memory system also includes second instructions that, when executed by the processing system, cause the processing system to perform operations of an application flow path device that is either included in the physical SDN network or coupled to the physical SDN network, and that is part of an application communication flow path enabled by the physical SDN network.

9. The IHS of claim 8, wherein the first virtual application-policy-based SDN controller is provided on the first device that runs the first application.

10. The IHS of claim 8, wherein the first virtual application-policy-based SDN controller is provided on one of the plurality of physical networking devices.

11. The IHS of claim 8, wherein the first virtual application-policy-based SDN controller is configured to:
determine a second application communication flow path through the physical SDN network, wherein the second application communication flow path is provided for second application communications that are between the first device and the second device and that involve the first application; and provide at least one application-policy-based flow rule to a second subset of the plurality of physical networking devices that are included in the second application communication flow path through the physical SDN network, wherein the at least one application-policy-based flow rule causes the second subset of the plurality of physical networking devices to transmit the second application communications such that the second application communications satisfy at least one network property.

12. The IHS of claim 8, wherein the memory system includes instructions that, when executed by the processing system, cause the processing system to provide a second virtual application-policy-based SDN controller that is configured to:
   determine a second application communication flow path through the physical SDN network, wherein the second application communication flow path is provided for second application communications that are between the second device and a third device and that involve a second application, wherein the second virtual application-policy-based SDN controller is associated with the second application, and wherein the second virtual application-policy-based SDN controller is not associated with the first application; and
   provide at least one application-policy-based flow rule to a second subset of the plurality of physical networking devices that are included in the second application communication flow path through the physical network, wherein the at least one application-policy-based flow rule causes the second subset of the plurality of physical networking devices to transmit the second application communications such that the second application communications satisfy at least one network property.

13. The IHS of claim 8, wherein the first virtual application-policy-based SDN controller is configured to provide the at least one application flow rule through a physical SDN controller to each of the first subset of the plurality of physical networking devices that are included in the first application communication flow path.

14. A method for application-policy-based Software Defined Networking (SDN) control comprising:
   determining, by a first virtual application-policy-based Software Defined Networking (SDN) controller, a first application communication flow path through physical SDN network, wherein the first application communication flow path is determined for first application communications that are between a first device that runs a first application and a second device, and that involve the first application that is associated with first virtual application-policy-based SDN controller, wherein the first virtual application-policy-based SDN controller is provided on a first virtualization device that is not a physical SDN controller device, that is either included in the physical SDN network or coupled to the physical SDN network, and that is part of at least one application communication flow path enabled by the physical SDN network; and
   providing, by the first virtual application-policy-based SDN controller, at least one application-policy-based flow rule to a first subset of a plurality of physical networking devices that are included in the first application communication flow path through the physical SDN network, wherein the at least one application-policy-based flow rule causes the first subset of the plurality of physical networking devices to transmit the first application communications such that the first application communications satisfy at least one network property.

15. The method of claim 14, wherein the first virtualization device is provided by the first device that runs the first application.

16. The method of claim 14, wherein the first virtualization device is provided by one of the plurality of physical networking devices.

17. The method of claim 14, further comprising:
   determining, by a backup virtual application-policy-based SDN controller that is provided on a second virtualization device that is different than the first virtualization device, that the first virtual application-policy-based SDN controller is unavailable; and
   performing, by the backup virtual application-policy-based SDN controller, the operations of the first virtual application-policy-based SDN controller.

18. The method of claim 14, further comprising:
   determining, by the first virtual application-policy-based SDN controller, a second application communication flow path through the physical SDN network for second application communications that are between the first device and the second device and that involve the first application; and
   providing, by the first virtual application-policy-based SDN controller, at least one application-policy-based flow rule to a second subset of the plurality of physical networking devices that are included in the second application communication flow path and that include at least one physical networking device that is not included in the first subset of the plurality of networking devices, wherein the at least one application-policy-based flow rule causes the second subset of the plurality of physical networking devices to transmit the second application communications such that the second application communications satisfy at least one network property.

19. The method of claim 14, further comprising:
   determining, by a second virtual application-policy-based SDN controller, a second application communication flow path through the physical SDN network, wherein the second application communication flow path is provided for second application communications that are between the second device and a third device and that involve a second application, wherein the second virtual application-policy-based SDN controller is associated with the second application and not the first application, and is provided on a second virtualization device that is not a physical SDN controller device, that is either included in the physical SDN network or coupled to the physical SDN network, and that is part of at least one application communication flow path enabled by the physical SDN network; and
   providing, by the second virtual application-policy-based SDN controller, at least one application-policy-based flow rule to a second subset of the plurality of physical networking devices that are included in the second application communication flow path through the physical SDN network, wherein the at least one application-policy-based flow rule causes the second subset of the plurality of physical networking devices to transmit the second application communications such that the second application communications satisfy at least one network property.

20. The method of claim 14, further comprising:
providing, by the first virtual application-policy-based SDN controller, the at least one application flow rule through a physical SDN controller to each of the first subset of the plurality of physical networking devices that are included in the first application communication flow path.

* * * * *